United States Patent Office 2,863,927
Patented Dec. 9, 1958

2,863,927
RECOVERY OF PURIFIED DI-TERTIARY-BUTYL-PARA-CRESOL

Louis L. Parisse, Oil City, Pa., assignor to Koppers Company, Inc., a corporation of Delaware No Drawing. Application June 13, 1955
Serial No. 515,223

10 Claims. (Cl. 260—624)

This invention relates to the separation and recovery of di-tertiary-butyl-para-cresol (hereinafter sometimes referred to as DTBPC) from its admixtures with related chemical compounds such as occur in crude DTBPC, crude cresol acid alkylate and CC oils. More particularly it relates to the recovery of DTBPC from its various crude products containing related chemical compounds by treatment with a liquid glycol, glycerine or mixtures thereof.

Pursuant to this invention, DTBPC is separarted and recovered from admixtures with related chemical compounds by heating such admixtures advantageously to about 80° C., with a liquid glycol, glycerine, or a mixture thereof to form a solution, and thereafter cooling to about 20° C. or below, whereupon substantially all of the DTBPC crystallizes out and is separated and recovered.

By "related chemical compounds" is meant the impurities which accompany DTBPC in its various crude forms, i. e., crude DTBPC, crude cresol alkylate (di-t-butylate), which impurities include mono-t-butyl-p-cresol, mono- and di-t-butyl-m-cresol, sulfonic acids, sulfones, etc. and CC oils, the latter being residual oils remaining after a portion of crude DTBPC has been crystallized and centrifuged out from cresol acid alkylate. CC oils distill in the same range as crude DTBPC.

The liquids advantageously used as selective non-solvents for DTBPC in its separation from related chemical compounds include ethylene glycol, propylene glycol, butylene glycol, glycerine and mixtures thereof, hereinafter referred to generally as polyhydric material.

Sufficient polyhydric material is used in proportion to the DTBPC-containing mixture to form a fluid solution when heated, advantageously to about 80° C. Suitably from about one to four weight parts polyhydric material to one part DTBPC-containing material is used.

The mixture of polyhydric material and DTBPC-containing material is vigorously stirred and heated to solution, advantageously to about 80° C., and then set aside to cool and precipitaate the DTBPC. If desired, a few DTBPC seed crystals are added at about 70° C. When crude cresol alkylate or crude DTBPC are processed, mechanical agitation is preferably continued during crystallization. After crystallization is completed at room temperature or below, as desired, the crystals are separated from the oil phases, suitably by centrifugal separation, subsequently washed with about two to three times their weight of distilled water while centrifuging and then dried. This procedure is repeated as desired to obtain a DTBPC of the desired purity. Substantially 100 percent of the DTBPC present in crude cresol alkylate is recovered by a single crystallization, pursuant to the present process. The polyhydric material can be recovered economically by distillation after separation of the DTBPC.

The following examples are in illustration of the invention as claimed, parts and percentages being by weight:

Example I

| | Parts |
|---|---|
| Propylene glycol | 100 |
| Crude DTBPC | 100 |
| | 200 |

Stir and heat to solution, ca. 80° C., and set aside to cool to room temperature, ca. 4.5 hours, $t=20°$ C. Percent DTBPC recovered, 70.6; F.P. 67.3° C. Similar advantageous results are obtained when a 1:1 mixture of ethylene and propylene glycols is substituted for the propylene glycol.

Example II

The following series shows recovery of DTBPC from a CC oil using ethylene glycol as selective non-solvent and room temperature crystallization:

| CC Oil, parts | Ethylene Glycol, parts | DTBPC Recovered | | Crystallization Time, Hours |
|---|---|---|---|---|
| | | Weight, parts | Percent | |
| 100 | 100 | 26 | 26.0 | 20 |
| 100 | 66.7 | 22.5 | 18.8 | 20 |
| 100 | 46.2 | 33 | 25.4 | 20 |
| 100 | 100 | 22 | 22.0 | 5 |

Similar advantageous results are obtained when a 1:2 mixture of ethylene: propylene glycol is substituted for the ethylene glycol.

Example III

The following series shows recovery of DTBPC from a CC oil using propylene glycol as selective non-solvent and room temperature crystallization:

| CC Oil | Propylene Glycol | DTBPC Recovered [1] | Percent DTBPC Recovered [2] | Contact Time (Hours) | F. Pt., °C. |
|---|---|---|---|---|---|
| 100.0 | 100.0 | 33.0 | 33.0 | 5 | 66.1 |
| 100.0 | 100.0 | 42.5 | 42.5 | 48 | 67.9 |
| 75.0 | 100.0 | 29.3 | 39.1 | 48 | 68.5 |
| 50.0 | 100.0 | 21.0 | 42.0 | 48 | 69.0 |
| 25.0 | 100.0 | 12.0 | 48.0 | 48 | 69.5 |

[1] Based upon weight of CC oil started with.
[2] DTBPC weighed after centrifuging.

Similar advantageous results are obtained when 1,4-butylene glycol is substituted for the propylene glycol.

Example IV

The following series shows recovery of DTBPC from crude cresol alkylate, conventionally prepared from 2° meta-para-cresol (containing 34% p- and 61% m-cresol) using butane-butene gas and sulfuric acid catalyst in the alkylation. The polyhydric material used as a 1:1 propylene glycol: ethylene glycol mixture, 2 parts per part cresol alkylate. Crystallization is at room temperature.

| Cresol Alkylate | Weight Alkylate | Weight Recovered DTBPC | Percent DTBPC Recovery [1] | F. Pt., °C. |
|---|---|---|---|---|
| Before neutralization | 250.0 | 54.0 | 21.6 | 66.9 |
| Neutralized | 300.0 | 56.5 | 18.9 | 66.8 |

[1] DTBPC weighed after centrifuging.

Glycerine is advantageously substituted for the mixed glycols used above. Better results are generally obtained when mixtures of liquid glycols are used in processing crude cresol alkylates than when individual glycols are used.

What is claimed is:

1. Process for separating and recovering di-tertiary-butyl-para-cresol from crude mixture containing impurities including mono-t-butyl-p-cresol, mono- and di-t-butyl-m-cresol, sulfonic acids and sulfones, which comprises heating to a temperature of at least about 80° C. the crude di-tertiary-butyl-para-cresol-containing mixture with a polyhydric material selected from the group consisting of liquid glycols, glycerine and mixtures thereof to form a solution, cooling to about 20° C. to crystallize di-tertiary-butyl-para-cresol, and separating said crystallized di-tertiary-butyl-para-cresol from said polyhydric material and said crude mixture, the proportions of said polyhydric material to said di-tertiary-butyl-para-cresol-containing mixture being from about 1:1 to about 4:1 on a weight basis.

2. Process of claim 1 in which the polyhydric material is ethylene glycol.

3. Process of claim 1 in which the polyhydric material is propylene glycol.

4. Process of claim 1 in which the polyhydric material is a mixture of ethylene and propylene glycols.

5. Process of claim 4 in which the proportion of ethylene glycol to propylene is 1:1 by weight.

6. Process of claim 4 in which the proportion of ethylene glycol to propylene glycol is 1:2 by weight.

7. Process for separating and recovering di-tertiary-butyl-para-cresol from admixture with the impurities contained in a crude mixture selected from the group consisting of crude di-tertiary-butyl-para-cresol, crude cresol alkylate and residual cresol acid alkylate oils from which a portion of di-tertiary-butyl-para-cresol has been removed, which comprises heating to a temperature of at least about 80° C. said crude mixture with a polyhydric material selected from the group consisting of liquid glycols, glycerine and mixtures thereof to form a solution, cooling to about 20° C. to crystallize di-tertiary-butyl-para-cresol and separating said substantially pure crystallized di-tertiary-butyl-para-cresol from said polyhydric material and said crude mixture, the proportions of said polyhydric material to said crude di-tertiary-butyl-para-cresol-containing material being from about 1:1 to about 4:1 on a weight basis.

8. The process of claim 7 in which the crude mixture is crude di-tertiary-butyl-para-cresol.

9. The process of claim 7 in which the crude mixture is crude cresol alkylate.

10. The process of claim 7 in which the crude mixture comprises residual cresol acid alkylate oils from which a portion of di-tertiary-butyl-parra-cresol has been removed.

References Cited in the file of this patent
UNITED STATES PATENTS

| | | |
|---|---|---|
| 2,202,877 | Stevens et al. | June 4, 1940 |
| 2,428,745 | Stillson | Oct. 7, 1947 |

UNITED STATES PATENT OFFICE

CERTIFICATE OF CORRECTION

Patent No. 2,863,927                                              December 9, 1958

Louis L. Parisse

It is hereby certified that error appears in the printed specification of the above numbered patent requiring correction and that the said Letters Patent should read as corrected below.

Column 3, line 5, for "mixture" read -- mixtures --; line 26, after "propylene" insert -- glycol --.

Signed and sealed this 14th day of April 1959.

(SEAL)
Attest:
KARL H. AXLINE
Attesting Officer

ROBERT C. WATSON
Commissioner of Patents